(12) United States Patent
Johnson

(10) Patent No.: US 11,085,497 B1
(45) Date of Patent: Aug. 10, 2021

(54) FLUID COUPLING WITH PARTIALLY CURVED IMPELLER VANES

(71) Applicant: David Johnson, Pell City, AL (US)

(72) Inventor: David Johnson, Pell City, AL (US)

( * ) Notice: Subject to any disclaimer, the term of this patent is extended or adjusted under 35 U.S.C. 154(b) by 0 days.

(21) Appl. No.: 17/066,587

(22) Filed: Oct. 9, 2020

(51) Int. Cl.
*F16D 33/20* (2006.01)

(52) U.S. Cl.
CPC .......... *F16D 33/20* (2013.01); *F16D 2300/12* (2013.01); *F16D 2300/26* (2013.01)

(58) Field of Classification Search
CPC .......... F16D 33/00; F16D 33/18; F16D 33/20; F16D 2300/26; F16H 41/24; F16H 41/26
USPC ............................ 192/58.3; 60/330, 364–367
See application file for complete search history.

(56) References Cited

U.S. PATENT DOCUMENTS

| | | | | |
|---|---|---|---|---|
| 2,046,703 A | * | 7/1936 | Sinclair | F16D 33/20 60/367 |
| 2,179,519 A | * | 11/1939 | Popper | F16D 33/20 60/350 |
| 2,381,187 A | * | 8/1945 | Swift | F16D 33/20 60/367 |
| 3,481,148 A | * | 12/1969 | Mlacker | F16D 33/20 60/366 |

FOREIGN PATENT DOCUMENTS

GB           978463 A  * 12/1964  ............. F16D 33/00

* cited by examiner

*Primary Examiner* — Richard M Lorence
(74) *Attorney, Agent, or Firm* — Burr & Forman LLP; Jeffrey H. Kamenetsky; Patrick A. Reid

(57) ABSTRACT

The fluid coupling of the present disclosure transmits torque by a fluid in a variable speed transmission. The fluid coupling comprises a front cover and a back cover, and the front cover and the back cover forming a chamber. The fluid coupling includes a plurality of impeller vanes are located on the back cover and the back cover is configured to rotate in a first direction. The fluid coupling also includes a turbine having a plurality of turbine vanes located within the chamber. The ends of each of the plurality of impeller vanes are curved in the first direction to direct flow of the fluid into the plurality of turbine vanes at a sharper angle thereby increasing torque applied to the turbine.

10 Claims, 8 Drawing Sheets

FLUID COUPLING WITH PARTIALLY CURVED IMPELLER VANES

FIELD

The present disclosure relates to a fluid coupling for a variable speed transmission for transferring torque between two rotary members, and particularly to a fluid coupling with a curved perimeter section of impeller vanes.

BACKGROUND

A fluid coupling uses an impeller and a turbine, usually within a housing with a working fluid. The impeller acts on the working fluid to rotate the fluid within the housing. The fluid then transfers that torque to the turbine vanes by acting on the turbine vanes to begin rotating the turbine. In a vehicle, the turbine is connected to a drive shaft to drive the wheels of the vehicle.

In a torque converter, a stator is used to take the fluid that is returning from the turbine to the impeller and alter the direction of flow of the fluid before the fluid returns to the impeller. The impeller then acts on the fluid to continue rotating and the fluid with increased torque then acts on the turbine resulting in a multiplied torque force to the engine.

Torque converters are complex due to the number of moving parts. Thus, there is a need to create a simplified fluid coupling that maintains the benefits of multiplying torque that is created by a stator.

SUMMARY

The present disclosure provides a fluid coupling to transfer torque between an impeller and a turbine in a vehicle transmission by rotating in a first direction thereby rotating a fluid in the first direction to rotate a turbine. The fluid coupling comprises a front cover and a back cover, with the front cover and back cover forming a chamber and a turbine located within the chamber. The fluid is rotated in the first direction by a plurality of impeller vanes affixed on an inside of the back cover. A perimeter section of each of the plurality of impeller vanes curving toward the first direction to direct the fluid into the turbine at an angle that applies increased torque to the turbine.

In one embodiment of the fluid coupling, the turbine further comprises a plurality of turbine vanes in a center section, a closed section, and a perimeter section. The center section and the perimeter section of the turbine are open to allow the fluid to pass between the plurality of turbine vanes in the center section and perimeter section. And the closed section of the turbine prevents the fluid from flowing between the plurality of turbine vanes in the closed section.

In another embodiment of the fluid coupling, a metal plate is attached to a back of the turbine over the closed section thereby blocking fluid flow through the portion of the vanes in the closed section.

In another embodiment, the front cover has a toroidal shape which directs the fluid that passes through the perimeter section of turbine vanes into the back of the center section of the turbine vanes.

In another embodiment, the front cover includes a plurality of blades located on an inner surface of the front cover configured to direct the fluid toward the back of the center section of the turbine in a complimentary direction thereby increasing torque applied in the direction of rotation.

In another embodiment, each of the plurality of blades is angled in the first direction to adjust the fluid flow into the center section of the turbine at an angle that increases the torque applied by the fluid as it enters the back of the center section of the turbine.

DETAILED DESCRIPTION

The present disclosure and accompanying figures present an improved fluid coupling that changes the shape and angle of impeller vanes to increase the torque applied by the fluid.

Figure 1:
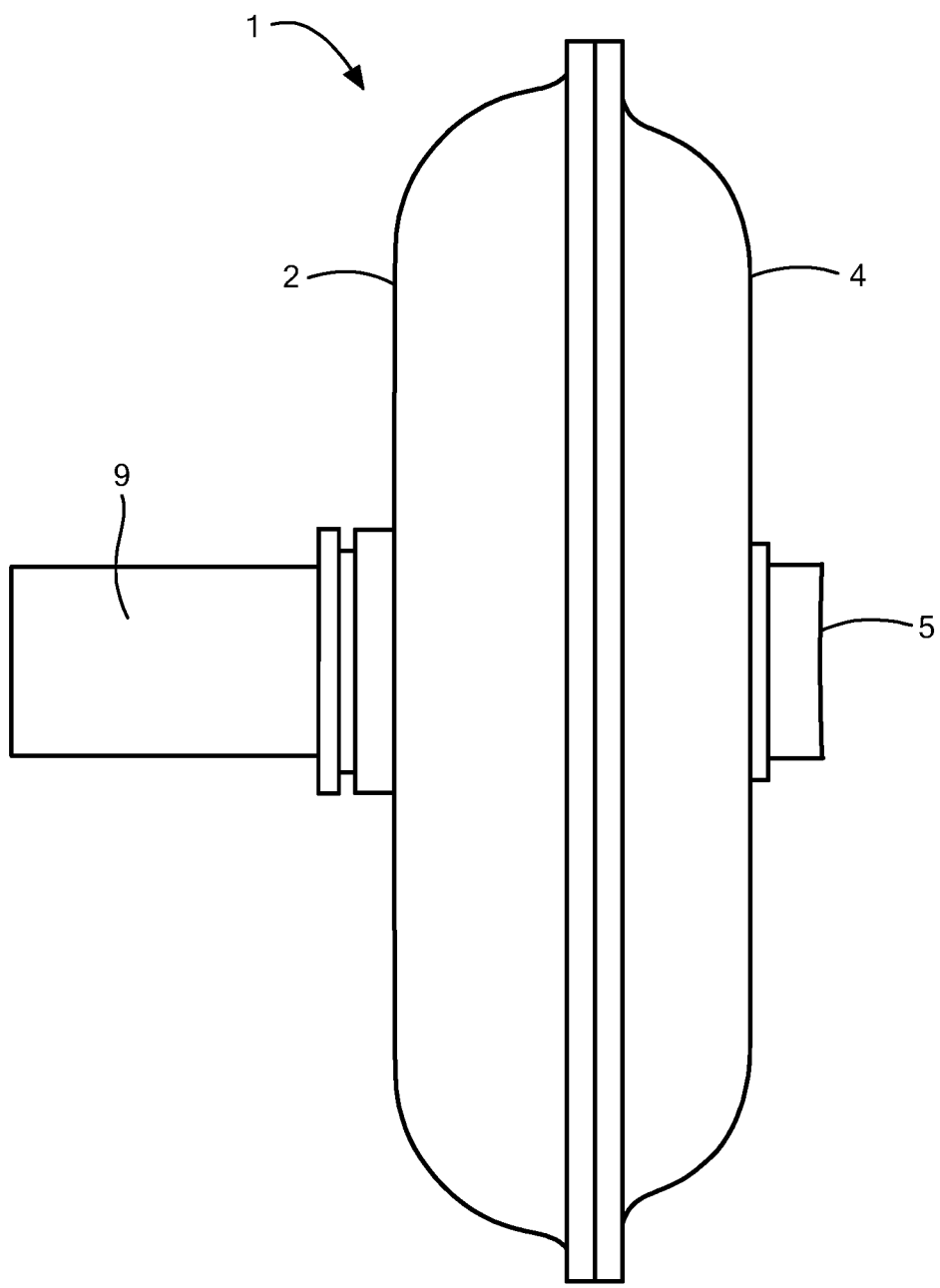
FIG. 1 is a side view of the fluid coupling according to the present disclosure.

Referring to FIG. 1, a side view of the fluid coupling according to the present disclosure is shown. The fluid coupling 1 is formed by securing the front cover 2 to the back cover 4. In a transmission, the back cover 4 is configured to receive torque from a vehicle engine (not shown) through an input shaft 5. This input torque is transferred via the turbine shaft 9 to drive the wheels of a vehicle.

Figure 2:
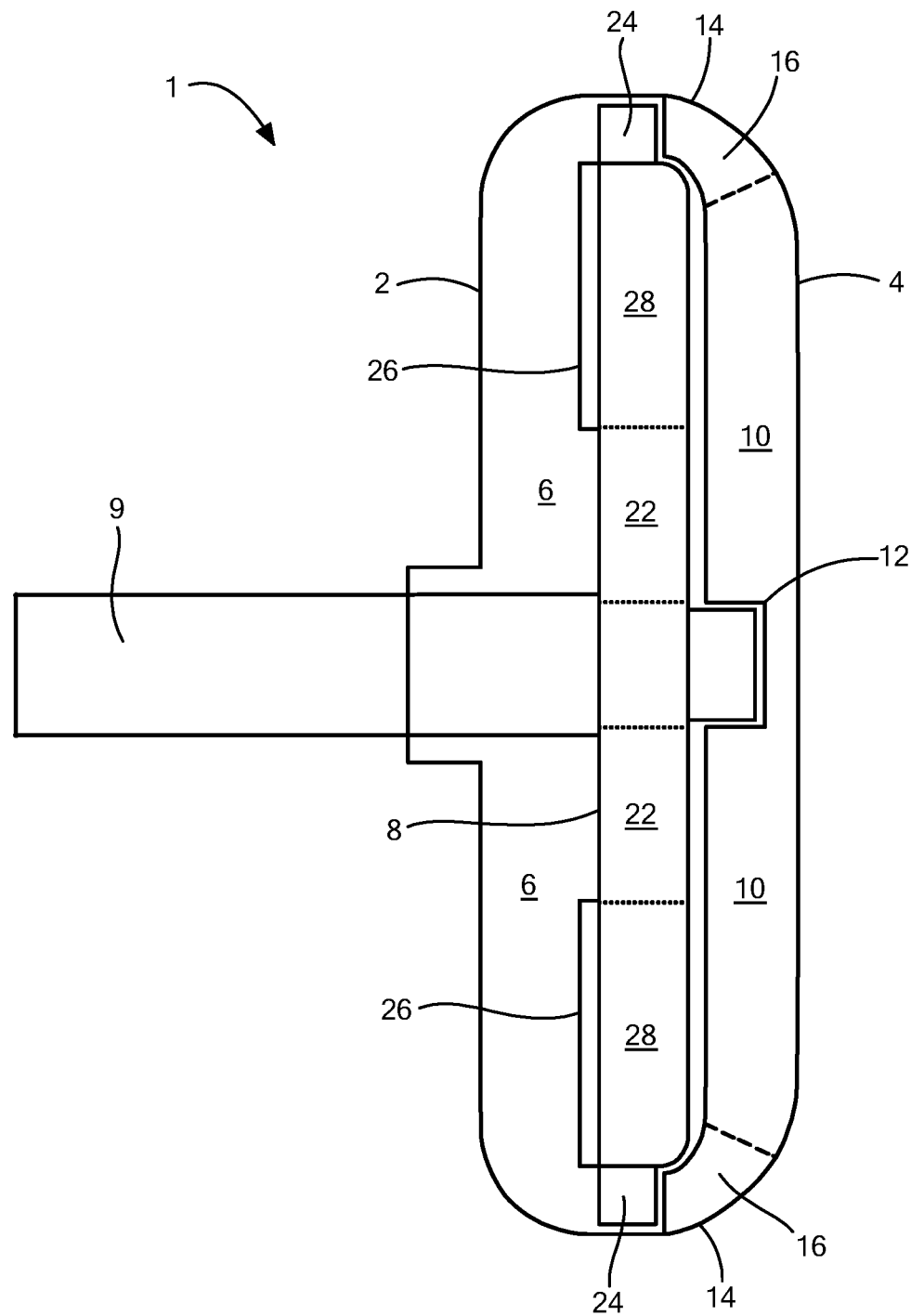
FIG. 2 is a side, cross-section view of the fluid coupling of the present disclosure.
Figure 3:
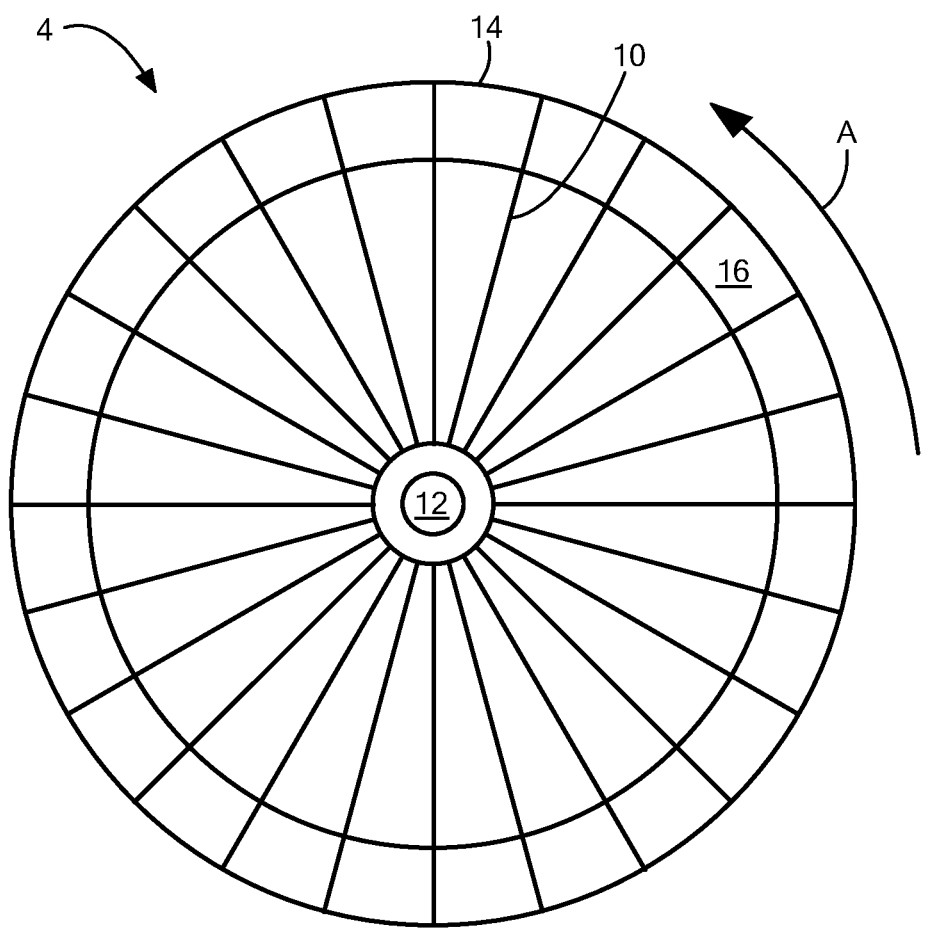
FIG. 3 is a cutaway view of a back cover of the fluid coupling of the present disclosure showing the impeller vanes.

Referring to FIGS. 2 and 3, FIG. 2 illustrates a side, cross-section view of the fluid coupling of the present disclosure according to one embodiment, while FIG. 3 illustrates the impeller vanes affixed to the back cover 4 with the front cover 2 removed. The fluid coupling 1 is comprised of a front cover 2 and a back cover 4 forming a chamber 6. A turbine 8 is situated within the chamber 6. A plurality of impeller vanes 10 are located on the back cover 4. The impeller vanes 10 extend outward radially from a center 12 of the back cover 4 toward a side 14 of the fluid coupling 1. A perimeter section 16 of the impeller vanes 10 is curved in the direction of rotation (arrow A) of the back cover 4. The impeller vanes 10 are straight from the center 12 out to the perimeter section 16. In the perimeter section 16, the ends of the impeller vanes 10 are curved or angled in the direction of rotation.

The impeller vanes 10 may be affixed to the back cover 4 of the fluid coupling 1. The impeller vanes 10 may be perpendicular to the back cover 4 extending out from a center 12 toward a side 14 of the fluid coupling 1. In this perimeter section, the ends of the impeller vanes 16 are angled or curved in the direction of rotation.

The turbine 8 has three distinct sections of vanes, a perimeter section 24, a closed section 28, and a center section 22. The center section 22 and the perimeter section 24 are open to allow fluid to pass through adjacent vanes. A metal plate 26 is affixed to the back of the closed section 28 to prevent fluid from passing through.

In operation, the fluid coupling 1 receives force from an engine (not shown) and begins rotating. As the fluid coupling 1 rotates, the back cover 4 having the impeller vanes 10 begins rotating the fluid within the chamber 6. The rotating fluid then begins acting on the turbine 8 to rotate the turbine 8 which is attached to a drive shaft 9 to transfer torque to the wheels of a vehicle (not shown).

Figure 4:
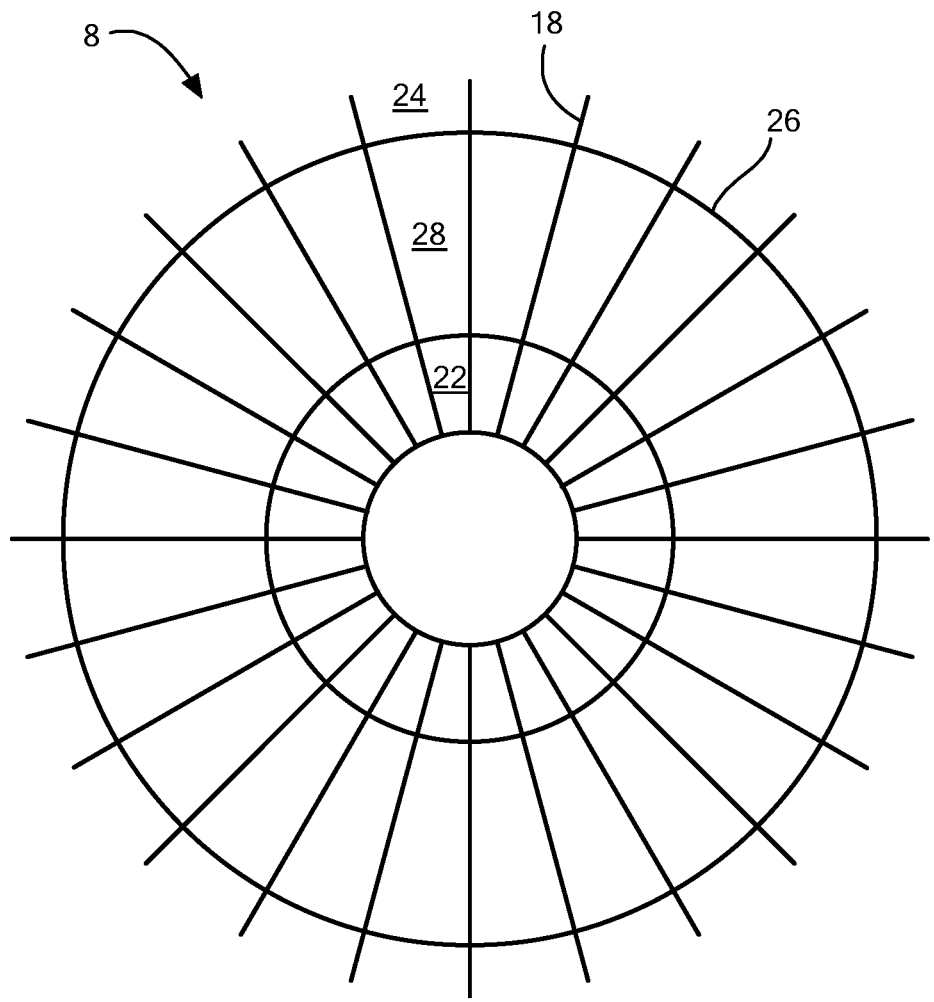
FIG. 4 is a front view of the turbine that sits within a chamber of the fluid coupling of the present disclosure.

FIG. 4 illustrates a front view of the turbine 8 removed from the fluid coupling 1. The center section 22 and the perimeter section 24 are open to allow fluid to flow between the turbine vanes 18. A metal plate 26 is attached to the back of the turbine 8 to create the closed section 28 that prevents the fluid from flowing between vanes 18 in the closed section 28.

Figure 5:
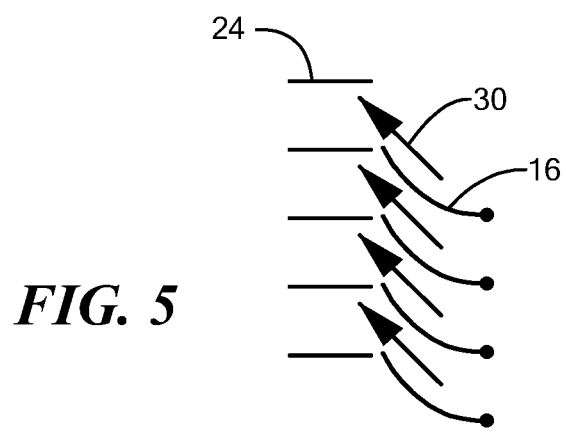
FIG. 5 illustrates the perimeter section of the impeller vanes directing fluid into the perimeter section of the turbine vanes.

FIG. 5 illustrates the flow of fluid 30 as it moves along the impeller vanes 10 to the curved ends in the perimeter section 24. The fluid then flows into the perimeter section 24 of the turbine 8 at a sharp angle resulting in increased torque applied to the turbine 8.

Figure 6:
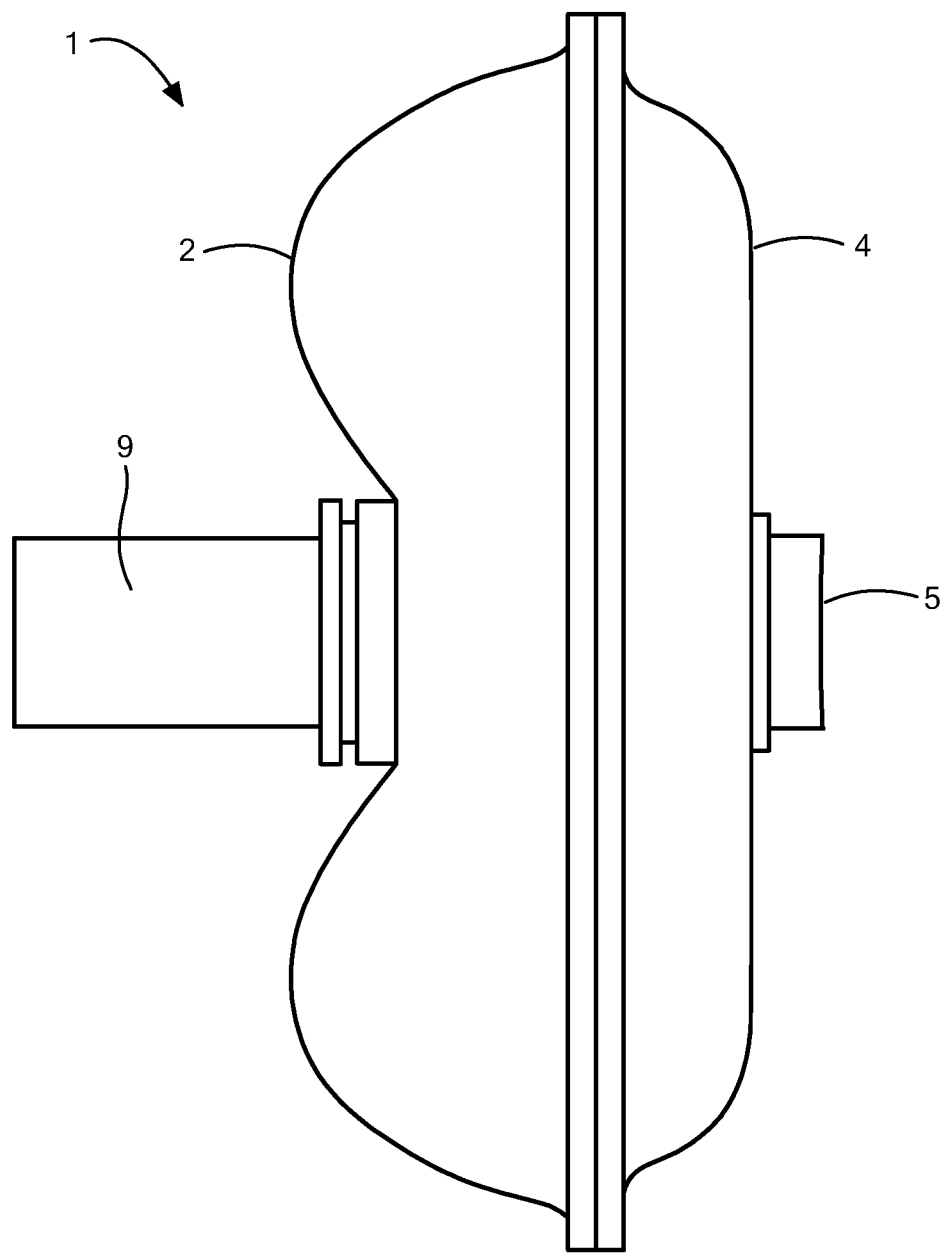
FIG. 6 is a side view of a second embodiment of the fluid coupling of the present disclosure.

Referring to FIG. 6, another embodiment of the fluid coupling according to the present disclosure is shown. In this embodiment, the front cover 2 has a torus shape resulting in a semi-toroidal fluid coupling.

Figure 7:
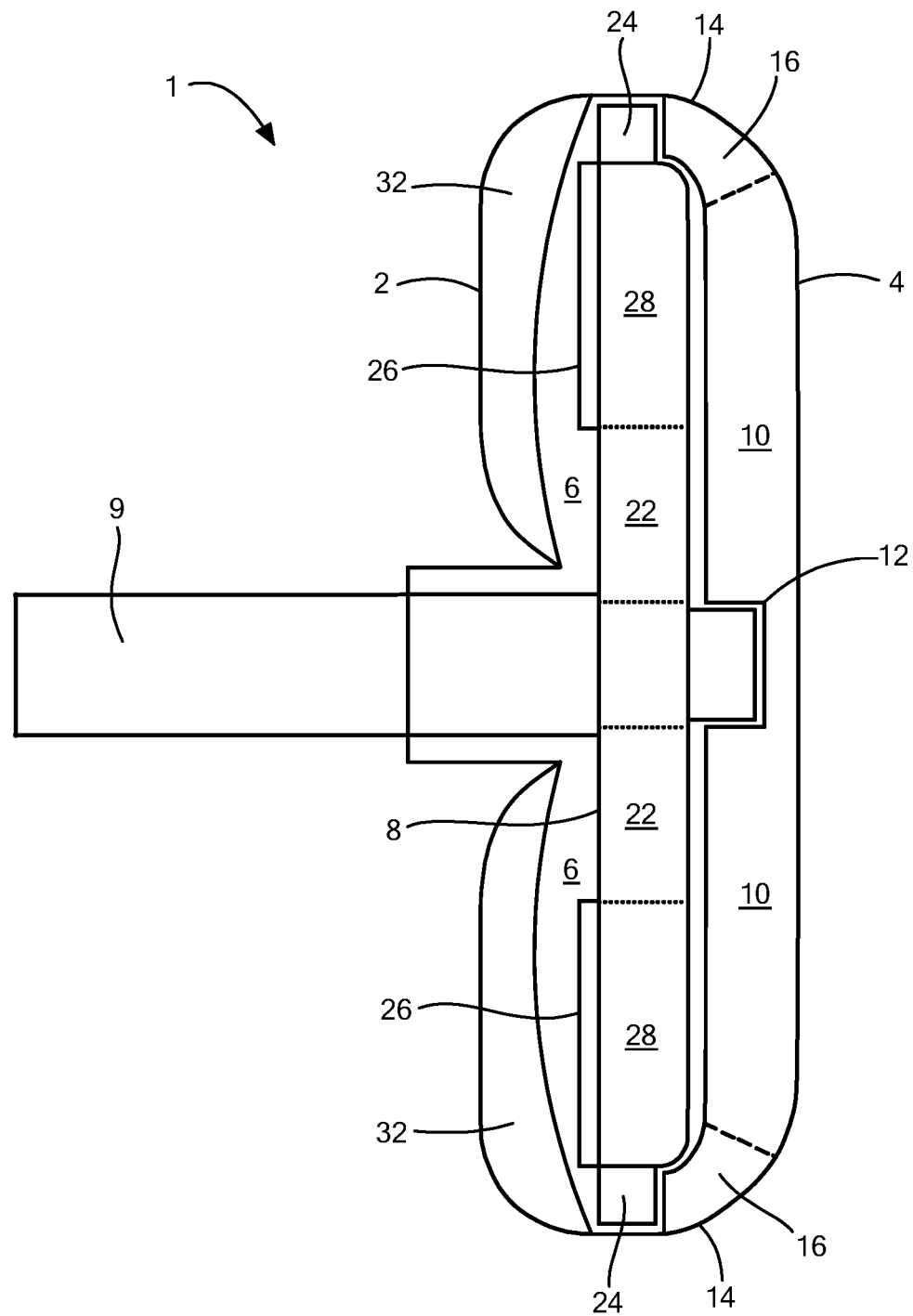
FIG. 7 is a side, cross-section view of the second embodiment of the fluid coupling of the present disclosure.

Referring to FIG. 7, a side, cross-section view of another embodiment of the fluid coupling is shown. The torus shape of the front cover 2 directs the fluid into the back of the center section 22 of the turbine 8.

In some embodiments, the fluid coupling may include blades 32 affixed to the front cover 2 to adjust fluid flowing into the back of the center section 22 of the turbine 8 to further multiply torque on the turbine. The blades 32 may be angled, curved, or slanted in the direction of rotation to direct the fluid 30 into the center section 22 at a sharp angle thereby applying more torque on the turbine 8.

In another embodiment, the blades 32 on the front cover 2 would be attached to a separate component (not shown) that fits within the torus shape of the front cover 2 such that the vanes could be locked or moved independently of the rotation of the fluid coupling.

Figure 8:
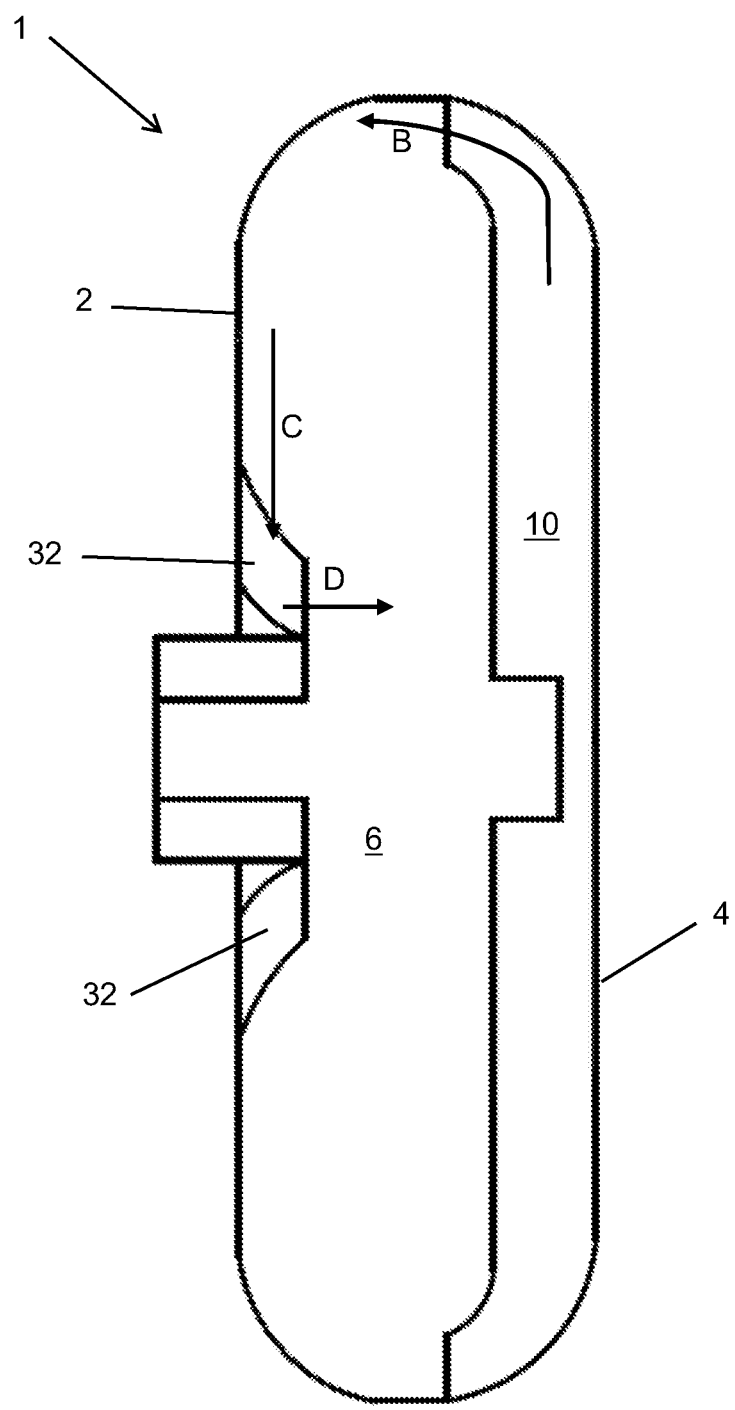
FIG. 8 is a side, cross-section view of a third embodiment of the fluid coupling of the present disclosure.

Referring to FIG. 8, another embodiment of the fluid coupling 1 according to the present disclosure is shown with the turbine 8 removed to show the flow of fluid within the fluid coupling 1. In some embodiments, the blades 32 are affixed to the inside of the front cover 2. As the impeller vanes 10 rotate, fluid in the fluid coupling begins to move to the side 14 (shown in FIG. 7) of the fluid coupling 1 (Arrow B). The fluid continues to move around the outer edge of the chamber 6 around the front cover 2 until it reaches the blades 32 (Arrow C). Because the blades 32 are angled or pitched the fluid is then directed back to the center of the back cover 4 to continue being rotated by the impeller vanes 10, thereby multiplying the torque applied.

Figure 9:
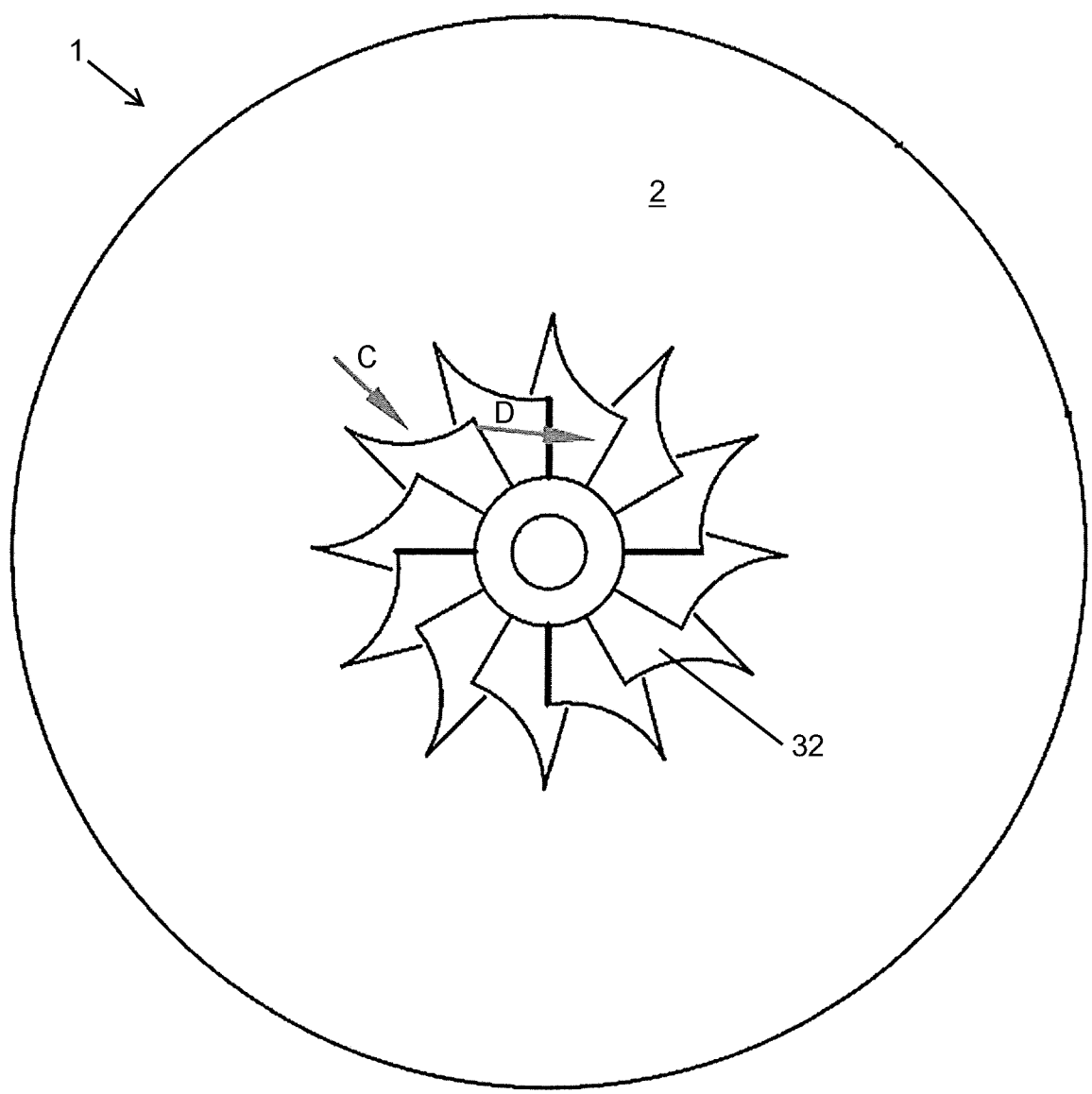
FIG. 9 is a cutaway view looking at a front cover of the third embodiment of the fluid coupling of the present disclosure showing the blades for redirecting fluid flow.

FIG. 9 shows a cutaway view of a front cover 2 of a fluid coupling 1 according to the present disclosure showing the blades 32. Arrow C shows fluid flowing along the front cover 2 into the blades 32 affixed on the front cover 2. Arrow D shows the fluid changing direction and moving out away from the front cover 2 back to the back cover 4 to continue being rotated by the impeller vanes 10.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A fluid coupling to transmit torque by a fluid, the fluid coupling comprising:
a front cover, the front cover having a plurality of blades located on an inner surface of the front cover;
a back cover, the front cover and the back cover forming a chamber, the back cover configured to rotate in a first direction;
a plurality of impeller vanes affixed to the back cover;
a turbine located within the chamber, the turbine having a plurality of turbine vanes, the plurality of turbine vanes having a center section, a closed section, and a perimeter section, the plurality of turbine vanes in the center section and the perimeter section are open to allow the fluid to pass between adjacent vanes, and a plate affixed to the plurality of turbine vanes in the closed section preventing the fluid from flowing between adjacent vanes;
the plurality of impeller vanes being curved in the first direction to direct flow of the fluid into the plurality of turbine vanes thereby increasing torque applied to the turbine; and
the plurality of blades configured to direct the flow of the fluid from a perimeter of the fluid coupling towards the back of the center section of the turbine in a complimentary direction thereby increasing torque applied.

2. The fluid coupling of claim 1, wherein the plate is attached to the closed section of the plurality of turbine vanes adjacent to the front cover and away from the back cover, blocking fluid flow between the plurality of turbine vanes in the closed section.

3. The fluid coupling of claim 1, wherein the front cover has a torus shape.

4. The fluid coupling of claim 1, wherein each of the plurality of blades is angled in the direction of flow of fluid to direct the fluid towards the back of the center section of the turbine.

5. A fluid coupling to transmit torque by a fluid comprising:
a front cover;
a back cover, the back cover and front cover forming a chamber, the back cover configured to rotate in a first direction;
a turbine located within the chamber, the turbine having turbine vanes, the turbine vanes having a center section, a closed section, and a perimeter section;
the center section and the perimeter section are open to allow fluid to flow through the turbine vanes;
a plate attached to the turbine vanes to form the closed section thereby preventing fluid flow through the closed section of the turbine vanes; and
a plurality of impeller vanes affixed to the back cover, and ends of the plurality of impeller vanes are curved toward the first direction of rotation to direct flow of the fluid into the perimeter section of the turbine thereby increasing torque applied to the turbine.

6. The fluid coupling of claim 5, wherein the plate is affixed to a side of the closed section of the turbine adjacent to the front cover.

7. The fluid coupling of claim 5, further comprising a plurality of curved blades on the front cover, the plurality of curved blades angled in the first direction and configured to adjust flow of the fluid toward the back of the center section of the turbine.

8. A fluid coupling to transfer torque by rotating a back cover in a first direction thereby rotating a fluid in the first direction to rotate a turbine, the fluid coupling comprising:

a front cover and a back cover, the front cover and back cover forming a chamber, the turbine located within the chamber;

a plurality of impeller vanes affixed on an inside of the back cover and a perimeter section of each of the plurality of impeller vanes curving toward the first direction; and a plurality of blades located on an inner surface of the front cover;

the turbine having a plurality of turbine vanes, the turbine vanes having a center section, a closed section, and a perimeter section;

the center section and the perimeter section of the turbine are open to allow the fluid to pass between the plurality of turbine vanes in the center section and the perimeter section, and the closed section of the turbine prevents the fluid from flowing between the plurality of turbine vanes of the closed section;

the perimeter section of the plurality of impeller vanes directing the fluid into the perimeter section of the turbine at an angle that applies increased torque to the turbine; and the plurality of blades configured to direct the fluid toward the center section of the turbine in a complimentary direction thereby increasing torque applied.

9. The fluid coupling of claim 8, wherein each of the plurality of blades is angled in the first direction to adjust the fluid flow into the center section of the turbine at an angle that increases the torque applied by the fluid.

10. The fluid coupling of claim 8, further comprising a metal plate affixed to the closed section of the turbine, the metal plate blocking fluid flow through the closed section to direct the fluid toward the plurality of blades located on the inner surface of the front cover.

* * * * *